Sept. 27, 1966 W. P. SIEGMUND 3,275,428
METHOD OF MAKING HONEYCOMB STRUCTURE
Filed May 21, 1963 2 Sheets-Sheet 1

INVENTOR.
WALTER P. SIEGMUND
BY
J. Albert Kultquist
ATTORNEY

Sept. 27, 1966    W. P. SIEGMUND    3,275,428
METHOD OF MAKING HONEYCOMB STRUCTURE
Filed May 21, 1963    2 Sheets-Sheet 2
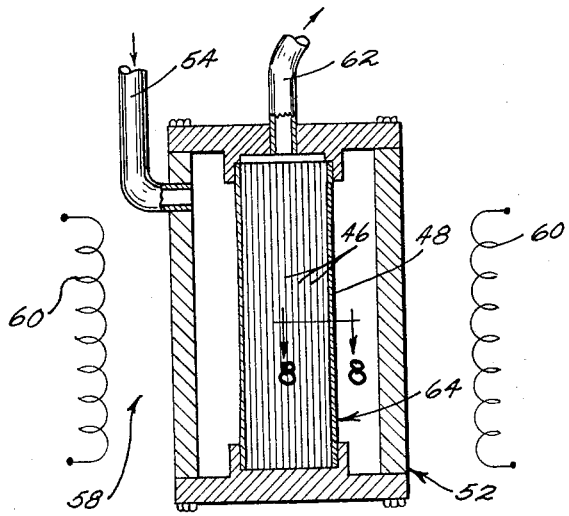
Fig. 7
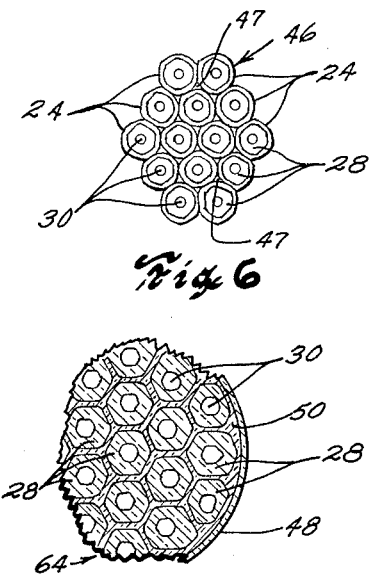
Fig. 6
Fig. 8
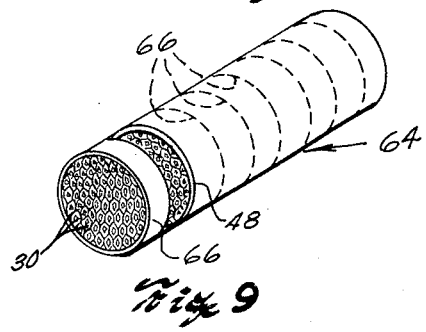
Fig. 9
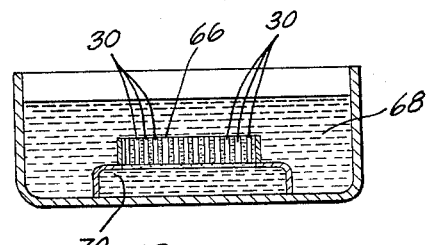
Fig. 10
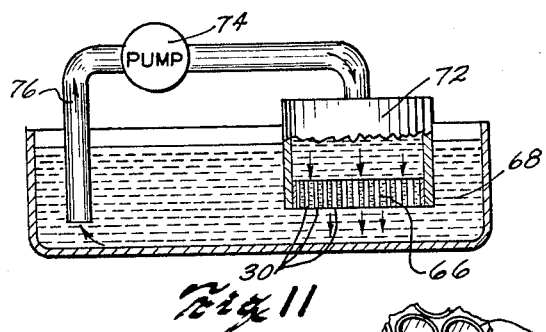
Fig. 11
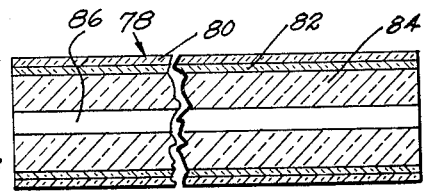
Fig. 12
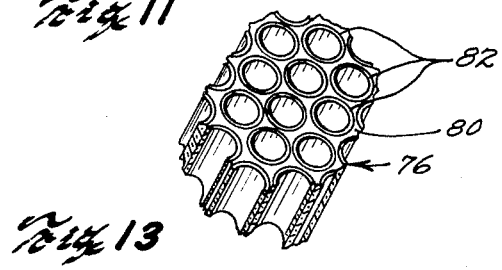
Fig. 13
INVENTOR.
WALTER P. SIEGMUND
BY J. Albert Hultquist
ATTORNEY 3,275,428
METHOD OF MAKING HONEYCOMB STRUCTURE
Walter P. Siegmund, Woodstock, Conn., assignor to American Optical Company, Southbridge, Mass., a voluntary association of Massachusetts
Filed May 21, 1963, Ser. No. 281,884
8 Claims. (Cl. 65—4)

This invention relates to honeycomb structures formed of glass and has particular reference to an improved method of making the same.

Glass honeycomb structures are of interest as fluid filters and also as a component of electron-multiplier devices. In one form of electron-multiplier device, a glass honeycomb is interposed between a cathode and an anode in an evacuated chamber. Electrons emitted by a photo-cathode or heated cathode are directed into the channels of the structure and as they strike the side walls of the channels cause the emission of further electrons which then are drawn toward the anode. In such cases, the channel walls are coated with a material which is capable of producing secondary electron emission. Furthermore, successive collisions of the electrons along the length of the channels cause repeated secondary electron multiplication.

In the past, attempts to fabricate glass honeycombs have involved making fused bundles of clad fiber-like elements having solid core parts which were removed by etching or otherwise chemically treating the bundles. Since, in such cases the removal process (i.e. etching) can proceed only from the ends of the fibers, complete removal of core parts requires relatively long periods of exposure to etching solutions which may cause at least partial destruction and weakening of the residual walls of the honeycomb.

Alternative prior practices involved the making of structures of an array of relatively thin hollow tubes instead of clad fibers. In such cases considerable difficulty attended the fusion of the array without destruction or collapse of respective tubes. Moreover, due to the fragility of such structures, finishing operations involving transverse cutting, grinding or polishing of end faces thereof often tended to cause undesirable chipping or fracturing of the honeycomb. The aforesaid problems become more severe as attempts were made to reduce the thickness of the walls of the honeycomb as compared to the open areas as is desirable particularly in electron multiplier applications.

Accordingly, an object of the present invention is to provide for simple, expedient and economical method of making improved glass honeycomb structures.

A further object is to provide such structures wherein the wall structure of the honeycomb occupies only a small fraction of the total volume of the structure while at the same time assuring that the channels extending therethrough are of controlled substantially uniform size and shape.

A still further object is to provide for the making of glass honeycomb structures which are readily reproducible within close limits.

In attaining the aforesaid objects and others which may appear from the following detailed description, glass honeycomb structures are formed, in accordance with the principles of the present invention, of a multiplicity of relatively long multilayer fiber-like tubules. Outer layers of each tubule are formed of a glass having a relatively high resistance to chemical etching and the innermost layers, each having a central opening therethrough, are formed of a different glass having a lower resistance to chemical etching so as to be readily removable. The glasses are thermally compatible to permit drawing and fusing of the tubules.

A number of such fiber-like tubules are bundled together in parallel side-by-side relation. Heat is applied to the bundle to cause the outermost layers of the tubules to fuse and form a homogeneous matrix between respective inner layers while central openings through the tubules are preserved. The resultant fused bundle is cut transversely into sections approximately equal in length to that desired of honeycomb structures to be formed therefrom. Opposite ends of respective sections can, at this stage, be ground and/or polished without danger of chipping or fracturing because of the added strength and mechanical stability provided by inner layers of the fused tubules. In completing the honeycomb structures, inner layers of the tubules are removed by etching. Residual glass of fused-together outer layers provides the honeycomb structure. In accordance with a particular feature of this invention, the provision of openings extending from end-to-end through inner layers of the tubules permits ready removal of these layers by solvent action or etching. Such action proceeds substantially uniformly along the entire length of respective tubules and in directions radially toward the fused outer layers thereof rather than only from opposite ends. Agitation or forced pumping of the solvent or etching solution through the openings can be effected to expediate removal of the inner layers.

As will be appreciated, uniform removal of inner layers in radial directions throughout the major portion of their length, rather than endwise, avoids prolonged exposure of inner areas of the honeycomb structure to solutions used for etching and thereby avoids possible destruction or weakening of the structure.

The present invention will be more fully understood by reference to the following detailed description which is accompanied by a drawing in which FIGS. 1 and 2 are enlarged fragmentary perspective views of exemplifying honeycomb structures to which the present invention is directed;

FIG. 6 is a greatly enlarged cross-section of such an assembly taken on line 6—6 in FIG. 5;

FIG. 7 illustrates a technique for making a final assembly of fiber-like tubules according to principles of the invention;

FIG. 8 is an enlarged fragmentary cross-sectional view taken on line 8—8 in FIG. 7;

FIG. 9 is a perspective view of the final assembly with a section removed therefrom;

FIG. 10 illustrates treatment of one section as shown in FIG. 9 to form a honeycomb structure in accordance with the invention;

FIG. 11 illustrates modification of the treatment illustrated in FIG. 10;

FIG. 12 is a greatly enlarged longitudinal cross-section of a modified fiber-like tubule useful in the making of honeycomb structures according to principles of the invention; and FIG. 13 is a fragmentary perspective illustration of a honeycomb structure formed of a multiplicity of such tubules.

Figure 1:
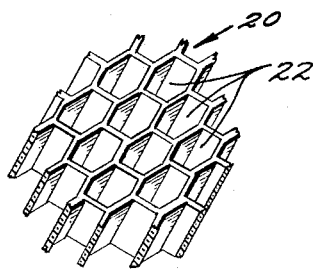
Figure 2:
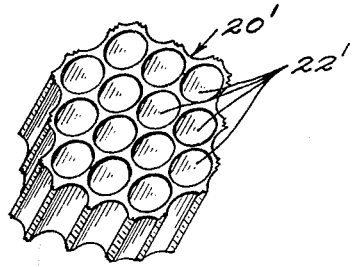

In the drawing there are illustrated, in FIGS. 1 and 2, examples of glass honeycomb structures 20 and 20' respectively which may be fabricated in accordance with the invention. As it can be seen, such structures can embody channels of different desired configurations such as hexagonal channels 22 shown in FIG. 1 or circular channels 22' shown in FIG. 2. Typical honeycombs for use as electron multipliers or the like would embody from $10^5$ to $10^7$ channels ranging in size from 10 to 50 microns in diameter with lengths of from 25 to 100 times their diameter. For other applications, different channel sizes and lengths might be desirable and are readily provided in accordance with the principles of the present invention.

Honeycombs 20 or 20' are formed of a plurality of multi-layer fiber-like tubules which are fused together in side-by-side relation and thereafter etched to form channels 22 or 22' therein by removal of respective inner layers of the tubules.

Figure 3:
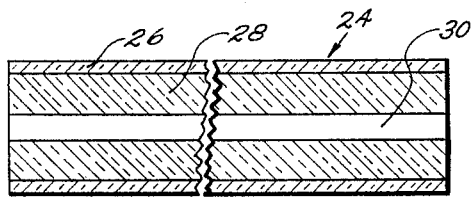
FIG. 3 is a greatly enlarged longitudinal cross-section broken away intermediate its ends of a fiber-like tubule useful in making honeycomb structures according to principles of the present invention.

A presently preferred type of tubule 24 is shown in FIG. 3. Tubule 24 comprises an outer cladding or layer 26 of glass which is relatively resistant to chemical etching and a core or inner layer 28 of glass having a lower resistance to chemical etching and which can be subsequently readily moved by acid etching or similar techniques. Innner layer 28 has axial opening 30 extending therethrough which may occupy approximately from 30% to 60% of the total volume of tubule 24 while outer layer 26 may occupy approximately 20% of the total volume. Glasses of respective inner and outer layers are selected to be thermally compatible to permit them to be drawn and fused.

Thus, outer layer 26 is preferably formed of a glass having a somewhat higher viscosity at fusing temperature than inner layer 28 when it is desired to form a honeycomb structure having uniform wall thickness as shown in FIG. 1. If, however, it is desired to form a structure such as shown in FIG. 2 having circular channels and non-uniform wall thickness, outer layer 26 should have a somewhat lower viscosity at fusing temperature than inner layer 28.

In fusing a number of tubules of the last mentioned type together in a bundle as will be described in detail hereinafter, outer layers 26 thereof will deform and fill interstices between respective tubules of the bundle while the shape of inner layers 28 will be preserved. Although circular channels 22' have been shown in FIG. 2 for purposes of illustration, it will become apparent that square, octagonal or other desired channel configurations can be formed by providing tubules 24 of the desired channel configuration. The shape of respective inner layers 28 thereof is preserved by selection of glasses in the manner described above with relation to FIG. 2. With tubules of circular cross-sections having outer layers 26 formed of a glass having a higher viscosity at fusing temperature than respective inner layers 28 as described with relation to the forming of honeycombs such as shown in FIG. 1, channels 22 of a generally hexagonal configuration will inherently result from the process of the invention.

Figure 4:
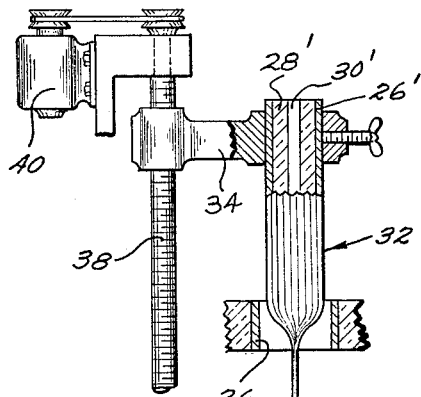
FIG. 4 illustrates a technique for forming such a tubule.

Fiber-like tubules 24 can be formed in the manner diagrammatically illustrated in FIG. 4 wherein a relatively large tubular assembly 32 of glasses which are to provide inner and outer layers of such tubules is heated and drawn axially to a reduced fiber size. Assembly 32 can be in the order of from ½ to 1 inch in diameter including outer tube 26' of glass which is to provide outer layer 26 of tubule 24 and inner tube 28' of glass which is to provide inner layer 28 of tubule 24. The glasses of tubes 26' and 28' are selected as pointed out above so as to provide the thermal and chemical properties desired for inner and outer layers of tubule 24. The cross-sectional dimensions of the tubes are proportional to the respective similar dimensions desired of tubule 24. Assembly 32 is supported adjacent one of its ends in holder 34 so as to depend approximately coaxially through heating ring 36. Heating ring 36 may be of any conventional design capable of heating assembly 32 to a temperature suitable for drawing in a short zone within the heating ring 36.

Ring 36 is heated to the desired operating temperature by electromagnetic induction, by resistance means (not shown) or by gas flames (not shown). Holder 34 is carried by lead screw 38 which, in turn, is driven by motor 40 in a direction such as to lower assembly 32 into heating ring 36. Upon becoming heated to a temperature suitable for drawing, the depending end of assembly 32 is drawn axially as indicated by arrow 42 at a rate so controlled as to produce fiber-like tubule 24 of desired cross-sectional size. At the same time, assembly 32 is continually lowered by actuation of lead screw 38 at a rate so controlled as to keep pace with the removal of material from its depending end as tubule 24 is progressively formed by drawing.

The geometry of a glass assembly such as 32 will be substantially retained in the fiber drawn therefrom and thus, opening 30' extending through tube 28' will, during the drawing process, be preserved as opening 30 in the resultant fiber-like tubule 24.

Tubules 24 of practically any desired diametral size can be formed by a single drawing operation. However, tubules of from 10 to 50 microns in diameter such as might be required for use in electron multiplier devices or the like would be difficult to handle as individual pieces in the fabrication of the honeycomb structure. Accordingly, the present invention further contemplates the making of assemblies of a multiplicity of tubules 24 which are redrawn together as fused multifibers to reduce the individual element size of the tubules. Such multifibers can be conveniently handled and assembled in side-by-side relation for fusing to form the basic structure of the ultimate honeycomb.

Figure 5:
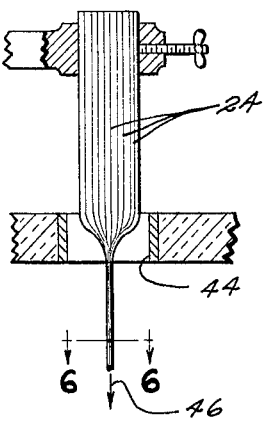
FIG. 5 illustrates a technique for making a preliminary assembly of a number of fiber-like tubules in accordance with one aspect of the invention.

In forming the multifibers, a number of tubules 24 are provided by cutting the drawn tubule 24 (FIG. 4) transversely into lengths of from 6 to 8 inches or longer if desired. The number of tubules 24, thus formed, are bundled together in side-by-side relation as shown in FIG. 5. The bundle so formed is lowered endwise into heating ring 44 which is similar to ring 36 in FIG. 4 and in a manner analogous to the initial drawing of tubules 24, the bundle is drawn to a reduced cross-sectional size thereby forming multifiber 46 (FIGS. 5 and 6). In this way, a 10 to 1 or greater reduction in size of individual tubules 24 can be accomplished with the multifiber 46 itself being of a size which can be conveniently handled. As it can be seen in FIG. 6, tubules 24 of multifiber 46 might not be completely fused by the process illustrated in FIG. 5 and interstices 47 may extend between respective tubules 24. Such interstices will, however, be closed and substantially eliminated during subsequent formation of the basic honeycomb structure particularly when tubules having outer layer glasses of lower viscosity than inner layer glasses thereof are used. For purposes of illustration, multifiber 46 is shown in FIG. 6 to embody only a few tubules 24, it being understood that such a multifiber can be formed of many more tubules 24 numbering in the hundreds if desired.

If it is desired to attain a reduction in size of individual tubules 24 beyond that which can be readily accomplished by a single multifiber drawing operation such as shown in FIG. 5, a number of multifibers 46 can be bundled together and redrawn to form a so called "multi-multifiber."

In all cases of drawing and redrawing tubules 24, openings 30 therethrough will inherently be preserved although reduced in size substantially proportionally with the reduction in size of respective tubules.

In forming the basic honeycomb structure, a number of multifibers 46 are provided by cutting the drawn multifiber 46 transversely into convenient lengths of from 6 to 8 inches or longer. The lengths of multifibers 46, thus formed, are placed in relatively tightly packed side-by-side parallel relation with each other lengthwise within a glass tube 48 (see FIG. 7). Tube 48 is formed of a glass which is thermally compatible with the glasses of respective multifibers 46 and which has a softening point closely approximating that of the outer layer glasses of tubules 24.

The assembly of the group of multifibers 46 within tube 48 is heated to a temperature sufficient to cause complete fusion of respectively adjoining outer layers 26 of tubules 24 and radial pressure is simultaneously applied to tube 48 to compress tubules 24 by an amount sufficient only to substantially eliminate interstices therebetween and cause respective outer layers 26 thereof to form a homogenous matrix 50 (see FIG. 8) between inner layers 28. A presently preferred manner of applying the radial pressure to the assembly of tube 48 and multifibers 46 comprises supporting said assembly within steel jacket or the like 52 as shown in FIG. 7. Compressed air or other gas pressure is directed through inlet 54 into jacket 42 to surround tube 48 and effect a uniform radial compressing force thereon. Jacket 52 can be placed within a furnace to effect fusion of multifibers 46 within tube 48 or positioned within a heated zone 58 (see FIG. 7) produced by suitable conventional electrical heating coils or the like 60. Preferably, vacuum line 62 is provided in communication with the space within tube 48 to outgas the glass structure during fusion thereof and thereby avoid possible entrapment of gases and the formation of bubbles in matrix 50 which might produce imperfections in the wall structures of the ultimate honeycomb.

Upon complete fusion of structure 64, it is removed from jacket 52 and cut transversely as shown in FIG. 9 into waferlike sections 66. Sections 66 are cut to approximately the lengths desired of respective honeycombs to be formed therefrom and prior to etching, opposite faces of sections 66 can be finished by grinding and/or polishing without danger of chipping or fracturing because of the added strength and mechanical stability provided by inner layers 28 of fused tubules 24. The waferlike sections are etched as shown in FIGS. 10 or 11 to form the final honeycomb structure by removal of inner layers 28 of fused tubules 24.

Etching of sections 66 can be accomplished as shown in FIG. 10 by immersion thereof in an etching solution 68 consisting of approximately 9.7 grams of ammonium bifluoride in 20 milliliters concentrated nitric acid and 72 milliliters of water. Other glass etching solutions may be used such as, for example, a solution consisting of 10% hydrofluoric acid with 20% nitric acid in 70% water. As illustrated in FIG. 10, rack 70 is provided to support sections 66 with opposite faces thereof exposed to solution 68. Thus, solution 68 will enter openings 30 to effect removal of layers 28 along the entire lengths of respective tubules 24.

By causing removal of inner layers 28 to proceed radially toward respective outer layer glasses of tubules 24 along the entire lengths of the tubules, the major portion of the length of matrix 50 in fused sections 66 is protected from exposure to etching solution 68 by the glasses of inner layers 28 substantially throughout the complete period of etching. Inner areas of matrix 50 will become exposed to etching solution 68 only upon complete removal of the glasses of inner layers 28 at which time etching is terminated. Etching is terminated by removal of section 66 from solution 68 and rinsing the same with water. By removal of inner layers along entire lengths thereof rather than only from opposite ends, periods required for etching are minimized. The short period of exposure of respective opposite ends of matrix 50 to the etching solution is not deleterious.

Etching solution 68 may be agitated ultrasonically or otherwise to expedite removal of inner layers 28 or it may be forcefully pumped through openings 30 as illustrated in FIG. 11. In FIG. 11, section 66 of structure 64 is supported in holder 72. Solution 68 is forced by pump 74 into holder 72 and through openings 30 in section 66. Other forms of pumps or the like can be used which, for example, might produce reciprocation of solution 68 in openings 30 without requiring that solution be passed through the particular pump. Otherwise, tubing and portions of a pump which are to be exposed to the etching solution should be formed of a material such as polyethelene or the like which is resistant to strong acids.

Referring more particularly to the selection of glasses used to fabricate the honeycomb structures illustrated in FIGS. 1 and 2, inner and outer layer glasses of tubules 24 must have compatible thermal properties (i.e. expansion coefficients and viscosities in the range of temperatures used for drawing and fusing) with a substantial difference in solubility in a solvent such as a strong acid of the type given by way of example hereinabove. The difference in solubility of respective glasses would preferably be such that the rate of removal of inner layer glasses by exposure to etching solutions such as mentioned hereinabove would be six or more times that of outer layer glasses.

By way of example, a structure such as shown in FIG. 1 may be formed of tubules 24 having outer layers 26 of soda lime glass which is relatively resistant to strong acids with inner layers 28 being formed of flint glass which, by comparison to soda lime glass, has a relatively low chemical resistance to etching and can be readily subsequently removed. The outer layer of soda lime glass also has a somewhat higher viscosity at fusing temperature than the inner layer flint glass whereby respective tubules will retain their uniform wall thickness when heated to fusing temperature in the manner illustrated in FIG. 7. The application of radial pressure as shown in FIG. 7 to a structure 64 formed of the above examples of glasses will, because of the lower viscosity of inner layer of glasses of the tubules, cause initially circular tubules to assume approximately the hexagonal geometry illustrated in FIG. 8. Upon removal of inner glasses 28 of fused tubules 24 residual glass of matrix 50 will comprise the honeycomb shown in FIG. 1 having substantially uniform wall thickness throughout.

If it is desired to form a honeycomb structure of the type illustrated in FIG. 2, the initial circular shape of inner layer glasses of tubules 24 is preserved during the fusing operation of FIG. 7. This is accomplished by forming inner layers of respective tubules 24 of glass having a somewhat higher viscosity at fusing temperature than respective outer layers. In such a case, inner layers 28 of tubules 24 are formed of a barium flint glass with outer layers 26 being formed of a soft lead containing glass known commercially as G12 and which, by comparison to barium flint glass, is relatively resistant to strong acids. Such glass also has a somewhat lower viscosity than the inner layer barium flint glass at fusing temperature.

In forming the basic honeycomb structure 64 with tubules of this latter type, outer layer glasses of tubules 24 will flow under radial pressure applied to the structure 64 and thereby fill interstices between respective tubules substantially without deformation of inner layers of the tubules. Subsequent removal of inner layers of tubules in the resultant fused structure will produce a honeycomb structure of the type illustrated in FIG. 2.

In FIG. 13, there is illustrated a modified honeycomb structure 76 which is formed of tubules of the type illustrated in FIG. 12 having three glass components. Tubule 78 (FIG. 12) comprises outer and intermediate relatively thin glass layers 80 and 82 respectively and inner glass layer 84 which is subsequently removed by etching to provide the honeycomb structure 76. Inner glass layer 84 embodies opening 86 extending therethrough.

Tubule 78 is formed in a manner analogous to the forming of tubules 24 by the addition of an outer glass tube to assembly 32 in FIG. 4 and the resultant three component assembly is heated and drawn to fiber size in the manner described with relation to the forming of tubules 24.

In the selection of glasses for the fabrication of tubules 78, outer layer 80 is preferably formed of a glass having an arbitrary chemical resistance (to etching) and lower viscosity (at fusing temperature) than intermediate layer 82. Intermediate layer 82 consists of a glass of higher viscosity (at fusing temperature) than outer layer 80 with a relatively high chemical resistance (to etching) and inner layer 84, which is to be subsequently removed, consists of a glass having a relatively low chemical resistance (to etching). The viscosity (at fusing temperature) of inner layer 84 is not critical and need not be particularly selected. All glasses should have compatible coefficients of expansion.

In forming the honeycomb structure 76, tubules 78 are substituted for tubules 24 in the steps of the process illustrated in FIGS. 5–11. During fusing of an assembly of tubules 78 in the manner shown and described with relation to FIG. 7, intermediate layers 82 of respective tubules, being of relatively high viscosity, will retain their initial geometry and that of respective inner layer glasses while outer layers 80, being of relatively low viscosity, will fill interstices between respective tubules 78. Upon removal of inner layers 84 by etching, the fused intermediate and outer layer residual glasses will provide the honeycomb structure 78 illustrated in FIG. 13.

The invention is not limited to the particular glasses or combinations thereof which have been set forth hereinabove and although particular steps in the process of the invention have been described for purpose of illustration, it is to be understood that the invention includes all modifications and equivalents which fall within the scope of the appended claims.

I claim:

1. The method of making a honeycomb structure comprising the steps of:

arranging a multiplicity of tubules, each having an inner layer of a first glass material defining a central opening through the tubule and an outer cladding layer of a second fusible glass material, in side-by-side contacting relation to each other to form a bundle, fusing said tubule claddings together to form a multitubular structure, and removing said inner layers of glass to form a honeycomb embodying only said second glass.

2. The method of making a honeycomb structure comprising the steps of:

arranging a multiplicity of tubules, each having an inner layer of a first glass material which is susceptible to chemical etching and defines a central opening through the tubule and an outer cladding layer of a second fusible glass material which is relatively resistant to chemical etching, in side-by-side contacting relation to each other to form a bundle, fusing said tubule claddings together to form a multitubular structure, and causing an etching medium to enter said central openings through said tubules to etch said inner layers of glass in directions radially toward said outer layers uniformly throughout the lengths of said tubules to form a honeycomb embodying only said second glass.

3. The method as recited in claim 2 wherein said first glass material is preselected to have a lower viscosity at fusing temperature than said second cladding glass material and said bundle is compressed during the step of fusing to form a homogeneous matrix of said second glass between said inner layers of first glass.

4. The method of making a honeycomb structure comprising the steps of:

arranging a multiplicity of tubules, each having an inner layer of a first glass material which is susceptible to chemical etching and defines a central opening through the tubule and an outer cladding layer of a second fusible glass material which is relatively resistant to chemical etching, in side-by-side contacting relation to each other to form a first bundle, heating and drawing said first bundle to form a relatively long fused multitubular structure of reduced cross-sectional size, cutting said structure into a number of relatively short lengths, arranging said lengths in side-by-side relation to each other to form a second bundle, fusing said lengths together, and causing an etching medium to enter said central openings through said tubules to etch said inner layers of glass in directions radially toward respective outer layers thereof uniformly throughout the tubules to form a honeycomb embodying only said second glass.

5. The method of making a honeycomb structure comprising the steps of:

arranging a multiplicity of tubules, each having an inner layer of a first glass material which is susceptible to chemical etching and defines a central opening through the tubule and an outer cladding layer of a second fusible glass material which is relatively resistant to chemical etching, in side-by-side contacting relation to each other to form a bundle, heating and drawing said bundle to form a fused multitubular structure of reduced cross-sectional size, and causing an etching medium to enter said center openings through said drawn and fused tubules to etch said inner layers of glass in directions radially toward said outer layers throughout the lengths of said tubules to form a honeycomb embodying only said second glass.

6. The method of making a honeycomb structure comprising the steps of:

arranging in side-by-side contacting relation to each other a multiplicity of tubules each having an inner layer of a first glass material which is susceptible to chemical etching defining a central opening through the tubule and an intermediate layer of glass material which is relatively resistant to chemical etching encompassed by an outer cladding layer of fusible glass material, fusing said cladding layers of said tubules together to form a unitary multitubular structure, and causing an etching medium to enter said central openings through said tubules to etch said inner layers of glass in directions radially toward said outer layers throughout the lengths of said tubules to form a honeycomb embodying only said second and intermediate layers of glass.

7. The method of making a honeycomb structure comprising the steps of:

arranging a multiplicity of tubules, each having an inner layer of a first glass material which is susceptible to chemical etching and defines a central opening through the tubule and an outer cladding layer of a second fusible glass material which is relatively resistant to chemical etching, in side-by-side contacting relation to each other to form a bundle, fusing said tubule claddings together to form a multitubular structure, cutting said structure transaxially into a number of sections, and causing an etching medium to enter said central openings through said tubules in each of said sections to etch said inner layers of glass in directions radially toward said outer layers uniformly throughout the lengths of said tubules to form of each of said sections a honeycomb embodying only said second glass thereof.

8. The method as recited in claim 2 wherein said inner layer of first glass material of each tubule occupies approximately from 30% to 60% of the cross-sectional area of the tubule and said second cladding layer of glass material occupies approximately 20% of said cross-sectional area.

References Cited by the Examiner
UNITED STATES PATENTS

| | | |
|---|---|---|
| 2,499,977 | 3/1950 | Scott. |
| 2,619,438 | 11/1952 | Varian et al. |
| 2,721,952 | 10/1955 | Kenyon. |
| 2,752,731 | 7/1956 | Altosaar. |
| 2,992,587 | 7/1961 | Hicks et al. _____ 65—31 X |
| 3,128,167 | 4/1964 | Woodcock. |
| 3,190,735 | 6/1965 | Kapany _____ 65—4 |

DONALL H. SYLVESTER, *Primary Examiner.*

F. W. MIGA, *Assistant Examiner.*